(12) United States Patent
Van Mechelen et al.

(10) Patent No.: US 8,882,906 B2
(45) Date of Patent: Nov. 11, 2014

(54) METHOD FOR RECYCLING WASTE WATER FROM A STAINLESS STEEL SLAG TREATMENT PROCESS

(75) Inventors: Dirk Van Mechelen, Tisselt (BE); Isabelle Lecomie, Vinalmont (BE); Evelyne Nguyen, Grez-Doiceau (BE)

(73) Assignee: Recoval Belgium, Farciennes (BE)

(*) Notice: Subject to any disclaimer, the term of this patent is extended or adjusted under 35 U.S.C. 154(b) by 0 days.

(21) Appl. No.: 13/810,625

(22) PCT Filed: Jul. 18, 2011

(86) PCT No.: PCT/EP2011/062218
§ 371 (c)(1),
(2), (4) Date: Apr. 25, 2013

(87) PCT Pub. No.: WO2012/007591
PCT Pub. Date: Jan. 19, 2012

(65) Prior Publication Data
US 2013/0206041 A1    Aug. 15, 2013

(30) Foreign Application Priority Data
Jul. 16, 2010 (EP) .................................... 10169932

(51) Int. Cl.
*C04B 7/04* (2006.01)
*C04B 28/04* (2006.01)
*C04B 22/00* (2006.01)
*C04B 18/14* (2006.01)
*C04B 7/36* (2006.01)

(52) U.S. Cl.
CPC ............ *C04B 7/364* (2013.01); *C04B 28/04* (2013.01); *C04B 22/0046* (2013.01); *C04B 18/142* (2013.01)
USPC ............ 106/705; 106/713; 106/745; 106/789

(58) Field of Classification Search
USPC ................... 106/713, 745, 789, 705
See application file for complete search history.

(56) References Cited

U.S. PATENT DOCUMENTS 3,837,872 A * 9/1974 Conner .................... 588/252
4,124,405 A * 11/1978 Quienot ................... 106/697
4,547,290 A * 10/1985 Pichat ..................... 588/257

FOREIGN PATENT DOCUMENTS

| CN | 101618892 | 1/2010 |
| CN | 101648759 | 2/2010 |
| EP | 00408545 | 1/1991 |
| EP | 0837043 | 4/1998 |
| JP | 2005095749 | 4/2005 |
| WO | 2008130208 | 10/2008 |
| WO | 2008145189 | 12/2008 |

OTHER PUBLICATIONS

JP 353072777 A Ando et al. (Jun. 28, 1978), abstract only.*
European Patent Office International Search Report and Written Opinion dated Nov. 2, 2011, for International Patent Application No. PCT/EP2011/062218. Applicant, Recoval Belgium (11 pages).

* cited by examiner

*Primary Examiner* — Paul Marcantoni

(57) ABSTRACT

The present invention relates to a method for recycling waste water from a stainless steel slag treatment process wherein stainless steel slag is brought into contact with water, in particular to neutralize the free lime contained therein, thereby producing said waste water. This waste water contains heavy metals, including at least chromium, and has a pH higher than or equal to 11. In accordance with the invention, it is used as production water for manufacturing mortar and/or concrete. In this way, the heavy metals, which are dissolved in the waste water and thus readily available, become bound in the newly formed cement phases so that they are prevented from leaching. Moreover, it has been found that the workability of the fresh mortar or concrete and also the quality of the final mortar or concrete materials is not negatively affected by the use of this alkaline waste water and that an accelerated setting could be achieved during the first hours.

15 Claims, No Drawings

METHOD FOR RECYCLING WASTE WATER FROM A STAINLESS STEEL SLAG TREATMENT PROCESS

The present invention relates to a method for recycling waste water from a stainless steel slag treatment process wherein stainless steel slag is brought into contact with water thereby producing said waste water which contains heavy metals, including at least chromium.

Stainless steel is made from iron and contains further chromium and, depending on the type of stainless steel, also nickel and/or molybdenum. During the production of stainless steel, a slag is generated which comprises mainly calcium silicates and additionally also heavy metals such as chromium, nickel and molybdenum. The slag further comprises stainless steel particles in different sizes and a small amount of free lime.

After being separated from the molten stainless steel, the liquid stainless steel slag is poured into large pits where it is allowed to cool down, partially by spraying water onto the hot steel slag. In order to reclaim the valuable stainless steel particles which are contained in the slag, the solidified slag is crushed or even ground into smaller particles from which the stainless steel particles can be removed. This can be done by hand picking, magnetic separation techniques, etc. As disclosed in EP 1 312 415 a wet jigging process can also be used to separate crushed slag particles which have a relatively high stainless steel content from those particles which contain less stainless steel particles. This separation process is carried out in a water bath and is based on a difference in the density of the slag particles.

Depending on their size, the stainless steel slag particles can be re-used as coarse or fine aggregate in the production of concrete or asphalt (bituminous concrete). After a fine milling, the finest particles can also be used as filler in asphalt (=bituminous concrete) or in concrete. A problem with slag aggregates is that they still contain free lime inclusions which may start to swell and thus cause cracks in the asphalt or concrete. As disclosed in EP 1 146 022 this problem can be solved by bringing the crushed stainless steel slag particles in contact with water so as to neutralize the free lime present therein. This can be done by submerging the stainless steel slag particles in water but it is preferably done by spraying water over the stainless steel slag. The neutralization water is collected and is re-used. In view of the large area required for this free lime neutralisation process, the stainless steel slag aggregates are treated outdoors. As a result thereof, in rainy periods, more water is collected which needs to be stored or even discharged. A problem in this respect is that by the repeated contact with the stainless steel slag the pH of this process water has raised to a pH value of 11 or even higher (usually higher than 12) so that a treatment with acid is required to meet the discharge standards. Moreover, the process water contains heavy metals, in particular chromium and usually also molybdenum, the content of which may exceed the discharge standards.

In EP 0 837 043, which is the parent application of EP 1 146 022, a test has been performed to determine whether an aqueous extract of stainless steel slags may have an effect on the setting time of cement. In this test 500 grams of two different cement types were mixed with respectively 133.5 and 132.0 grams of the aqueous extract to achieve a cement paste of a normalized consistency. The water/cement ratio's were thus approximatively 0.26. The test indicated that the aqueous extract of stainless steel slag might have some effect of the setting time of the cement and that the crushed stainless steel slags used in EP 0 837 043 as coarse or fine aggregate to produce mortar or concrete may thus accelerate the binding of the mortar or concrete. Just like EP 1 146 022 EP 0 837 043 also discloses to bring the stainless steel slags into contact with water to neutralize the free lime contained therein in order to avoid swelling of the steel slag aggregate in the mortar or concrete. However, it doesn't describe or suggests any solution for the problem of the waste water generated by this neutralisation process.

An object of the present invention is to provide a new method which enables to recycle the excess of process water of the above described slag treatment processes without causing environmental problems.

To this end the method according to the present invention is characterised in that the waste water is used for manufacturing mortar and/or concrete, which mortar and/or concrete is made by mixing at least one hydraulic binding agent, at least one aggregate and water.

In this way, the method according to the invention does not only solve the problem of the excess of polluted process water but also contributes in solving the problem of the depletion of the natural drinking water resources since the waste water is now used as production water for manufacturing mortar and/or concrete. As a matter of fact, mortar and concrete are made in practice using drinking water as production water.

In accordance with the present invention it has been found that, notwithstanding the presence of a relatively large amount of heavy metals in the waste water, these dissolved and thus readily available heavy metals become bound in the newly formed cement phases during the hardening of the mortar or concrete so that they are prevented at least to a large extent from leaching. Tests have shown more particularly that the leaching standards for bound applications are indeed not exceeded when the waste water of stainless steel slag treatment processes is used as production water for the manufacturing of mortar or concrete. Moreover, although U.S. Pat. No. 6,682,655 teaches that alkaline waste water, more particularly the high-pH, toxic alkaline wash-water of concrete mixer trucks, can cause poor slump control, reduced strength and unpredictable finishing characteristics, it has also been found that the high pH alkaline waste water resulting from stainless steel slag treatment processes, has no negative effect on the quality of concrete made with such waste water, more particularly on the final strength and on the workability of the concrete (sufficiently high slump in the slump test and flow in the flow table test). Additionally, during the initial setting phases of the mortar or concrete, some acceleration of this setting has been observed without having however a deleterious effect on the final properties of the mortar or concrete as observed for some known accelerators.

In a preferred embodiment of the method according to the invention, the waste water used to manufacture said mortar and/or concrete has a pH higher than 7, in particular higher than 9 and more particular higher than 11. The waste water usually even has a pH higher than 12, in particular higher than 12.5 and often even higher than 13.

As explained hereabove, the alkaline waste water which is used as production water for manufacturing mortar or concrete has no negative effect on the quality and the workability of the mortar or concrete so that, although it is possible to neutralize it in advance to some extent, it is not necessary to neutralize the waste water before adding it to the mortar or concrete composition. To save expenses for acids, the waste water is therefore preferably not neutralized or only to a limited extent.

In a further preferred embodiment of the method according to the invention, the hydraulic binding agent used to produce the mortar and/or the concrete contains di-and tricalcium silicates (belite and ante) such as ordinary Portland cement.

Upon reaction with water, these hydraulic binding agents produce calcium hydroxide ($Ca(OH)_2$) and a hydrate, more particularly C—S—H(=$3CaO.2SiO_2.3H_2O$), which grows as a mass of interlocking needles that provide the strength of the hydrated cement system. This hydraulic reaction is thus not disturbed by the high pH of the alkaline waste water nor by the heavy metal salts or bases contained therein. Moreover, the heavy metals which are dissolved in the waste water and thus readily available for leaching appear to be bound to a large extent in these newly formed cement phases.

In an advantageous embodiment of the method according to the invention, the mortar and/or concrete is made with an amount of water which comprises more than 30 wt. %, preferably more than 35 wt. % of the amount of cement used to produce the mortar and/or concrete. Moreover, the water used to manufacture the mortar and/or the concrete comprises preferably at least 50%, more preferably at least 75% and most preferably at least 90% of said waste water.

In this way, quite large amounts of the waste water can be incorporated in the mortar or concrete.

Other particularities and advantages of the invention will become apparent from the following description of some particular embodiments of the method according to the present invention.

The present invention generally relates to a new method for recycling waste water generated during the processing of stainless steel slag. Stainless steel contains mainly iron and further at least chromium and optionally other heavy metals such as nickel and molybdenum. During the production of stainless steel, calcium and magnesium oxides/carbonates (f.e. burned lime, calcite, dolomite and magnesite) are added to the furnace (in particular an electric arc furnace) to produce a liquid slag on top of the molten slag. This slag acts as a destination for oxidised impurities. After the steel making process, the slag is poured into pits and is allowed to cool down. To accelerate the cooling process, water is sprayed onto the hot slag. During the cooling process, different amorphous and crystalline phases are formed, including calcium silicates.

The solidified pieces of stainless steel slag are crushed to produce fine or coarse aggregates which can be used in particular for producing concrete or asphalt (=bituminous concrete) (see EP 0 837 043 which is incorporated herein by reference). As disclosed in EP 2 160 367 the crushed stainless steel slag particles can also be further grinded or milled to a very small particle size, in particular to a particle size smaller than 63 μm so that the grinded stainless steel slag particles can be used as a filler in concrete (in particular self-compacting concrete) or in asphalt. Crushing/grinding of the stainless steel slag enables to recover as much as possible of the valuable stainless steel which is contained in stainless steel slag. This can be done by hand picking, magnetic separation techniques or density separation techniques. A preferred density separation technique is the wet jigging technique which is disclosed in EP 1 312 415. This European patent application is also incorporated herein by reference. In this wet jigging technique, the stainless steel slag particles are made to float in water so that they can be separated based on their density.

Fresh stainless steel slag always still contains some free lime (Le. CaO). This free lime may be present in the form of small or larger inclusions in the stainless steel slag particles. When used as aggregate for concrete or asphalt, it is important that this free lime is neutralised since when the free lime inclusions come into contact with water, they may start to swell thus causing cracks in the concrete or asphalt. To solve this problem, the crushed/grinded stainless steel slag particles are brought in contact with water to neutralise the free lime contained therein. As disclosed in EP 1 146 022, which is incorporated herein by reference, this can be done by immersing the stainless steel slag particles in a bath of water or the water can be sprayed onto the stainless steel slag particles.

By being brought in contact with the stainless steel slag particles, the pH of the neutralisation water rises and also its heavy metal content. The neutralisation water is therefore collected in one or more reservoirs and is re-used for the neutralisation process. Although part of this water also evaporates, there is a surplus of water during rainy periods. Consequently, part of the neutralisation water needs to be discharged. Also the water used in the wet jigging installation needs to be refreshed from time to time and needs thus also to be discharged.

In accordance with the present invention it has been found that this process or waste water can be used as production water for manufacturing mortar and/or concrete without having negative effects on the quality and workability of the mortar or concrete and also without causing leaching problems. The drinking water which is normally used as production water for mortar or concrete can thus be replaced by this waste water.

Mortar and concrete are made by means of a hydraulic binding agent that preferably contains di-and tricalcium silicates (Le, belite and elite). The binding agent comprises in particular finely ground Portland clinker. The hydraulic binding agent is contained in cement which may be ordinary Portland cement, consisting mainly of Portland clinker, or which may be a composite cement wherein a part of the Portland clinker is replaced by other hydraulic or pozzolanic materials. These composite cements are Portland cement blends such as Portland fly ash cement (CEM II) containing up to 30% of fly ash (and a little gypsum) and Portland blast furnace cement (CEM III) containing up to 70% of ground granulated blast furnace slag. All of these cements thus comprise at least 10% by weight, preferably at least 20% by weight and more preferably at least 30% by weight of Portland clinker.

The mortar or concrete is made with at least 65 kg, preferably with at least 100 kg and more preferably with at least 150 kg of cement per cubic meter. The amount of cement used to produce the mortar or the concrete is usually smaller than 500 kg per cubic meter and preferably smaller than 450 kg and more preferably smaller than 400 kg per cubic meter of mortar or concrete. Further, use is made of at least one fine aggregate (sand) and, for making concrete, also of at least one coarser aggregate (gravel or crushed materials, in particular crushed limestone). The fine and coarser aggregates may comprise natural materials but also slag material, in particular stainless steel slag, or a combination thereof (see EP 0 837 043 which is incorporated herein by reference). Even a fine aggregate has a much coarser particle size distribution that the hydraulic binding agent. In general, at least 50 vol. % of the aggregate (or mixture of aggregates) used to produced mortar or concrete has a particle size larger than 0.5 mm or even larger than 1.0 mm. For the preparation of the mortar or concrete, further additives may be used such as plasticizers or superplasticizers, accelerators, retarders, etc. Also fillers may be used, i.e. powdery materials having a particle size of less than 63 μm. These fillers may be made from natural materials, such as limestone, or from other materials such as from stainless steel slag.

In accordance with the present invention the production water used to prepare the mortar or concrete comprises waste water from the above-described stainless steel slag treatment process. The production water preferably comprises at least 50%, more preferably at least 75% and most preferably at least 90% of this waste water. Due to having been brought into contact with the stainless steel slag, the waste water has a pH higher than or equal to 11, and in particular a pH of at least 12 or more particularly of at least 12.5 or even of at least 13.0. It may be neutralized to some extent before adding it to the mortar or concrete composition but in that case the pH of the alkaline waste water is preferably maintained above 7, more preferably above 9 and more preferably above 11 to limit the amount of acid required for this neutralisation. The alkaline waste water moreover contains heavy metals including at least chromium. The chromium content of the waste water (expressed as mg Cr/l) is normally higher than or equal to 0.2 mg/l, in particular higher than or equal to 0.4 mg/l and more in particular higher than or equal to 0.5 mg/l. When molybdenum is used in the production of the stainless steel, the waste water also contains molybdenum, in particular more than 1 mg/l and more particularly even more than 2 mg/l (expressed as mg Mo/l).

Most of the chromium contained in the waste water is trivalent chromium. Hexavalent chromium is either absent or present in small amounts. However, some waste water samples contained higher amounts of Cr(VI), namely even up to 0.4 to 0.5 mg/l. Since Cr(VI) is water soluble whilst Cr(III) isn't, and since Cr(VI) may be carcinogenic, the Cr(VI) is preferably reduced in the waste water to Cr(III) before using this water as production water for the manufacturing of mortar or concrete. This can be done by adding one or more reductants thereto such as ferrosalts (f.e. $FeCl_2$ or $FeSO_4$) or small metallic iron particles (nanoparticles).

In accordance with the present invention it has been found that the use of the stainless slag process water did not have a negative effect on the quality of the concrete or mortar produced with this waste water (in particular on the compression strength) and also not on the workability of the concrete or mortar. No extra costs need thus to be made for example for additional plasticizers or superplasticizers (f.e. polycarboxylates). Importantly, the heavy metals contained in the waste water, in particular the chromium, were found to be bound in the concrete or mortar so that leaching thereof was greatly reduced, this notwithstanding the fact that the heavy metals were contained in a water soluble form in the waste water and could thus be expected to leach readily from the mortar or concrete.

EXAMPLES

Example 1

Tests on Cement Pastes

1. Required Amount of Water

The amounts of demineralised water and of stainless steel slag waste water (having a pH of 12.8 and containing 0.902 mg/kg Cr and 3.86 mg/kg Mo) required to produce a cement paste of a normalised consistency were determined in accordance with the standard NBN EN 196-3, and this both with the ordinary Portland cement CEM I 42,5 R HES and with the Portland blast furnace cement CEM III/A 42,5 N LA. The results of these tests are given in Table 1.

TABLE 1

Results of the cement paste tests.

| Cement | Type of water | Amount | W/C ratio | Distance plunger-bottom (must be between 4 and 8) |
|---|---|---|---|---|
| 500 g CEM I | Demi water | 122 g | 0.244 | 5 |
|  | Waste water | 123 g | 0.246 | 7 |
| 500 g CEM III | Demi water | 134 g | 0.268 | 5 |
|  | Waste water | 137 g | 0.274 | 7 |

These tests show that the use of either demineralised water or of alkaline waste water has substantially no effect on the amount of water required to achieve a certain consistency of the cement paste.

2. Setting Times

The setting times of the cement pastes of normalised consistency described hereabove were determined in accordance with the standard NBN EN 196-3. The results of these tests, which are an average of three tests, are given in Table 2.

TABLE 2

Beginning and end of the setting of the cement pastes of Table 1 of normalised consistency.

| Cement | Type of water | Beginning (minutes) | End (minutes) |
|---|---|---|---|
| CEM I 42,5 R HES | Demi water | 185 | 240 |
|  | Waste water | 190 | 230 |
| CEM III/A 42,5 N LA | Demi water | 165 | 205 |
|  | Waste water | 170 | 210 |

These tests show that the use of either demineralised water or of waste water (having a pH of about 12.8) has substantially no effect on the setting times of cement pastes, Example 2

Effect on Workability and Compression Strength of Concrete

1. Preparation of the Concrete and Tests on the Fresh Concrete

Four concrete mixtures were made. For each mixture a mixture of aggregates was used so that a particle size distribution was obtained falling within the range determined by the standard NBN EN 480-1 for reference concrete. Superplasticizer (on the basis of polycarboxylate) was each time added in an amount such as to achieve a slump of 160±10 mm.

Details of the compositions of the different mixtures, the slumps (measured with the slump test according to NBN EN 12350-2, the flows (measured with the flow table test according to NBN EN 12350-5), the density (measured in accordance with NBN EN 12350-6) and the air content (measured in accordance with NBN EN 12350-7) are given in Table 3. The same water, having a pH of 12.8, was used as in Example 1.

TABLE 3

Concrete compositions and slump and flow table test results

| | Mixture | | | |
|---|---|---|---|---|
| | M1 | M2 | M3 | M4 |
| Composition (kg/m³) | | | | |
| CEM I 42,5 R HES | 320 | 320 | 0 | 0 |
| CEM III/A 42,5 N LA | 0 | 0 | 320 | 320 |
| Drinking water | 160 | 0 | 160 | 0 |
| Waste water | 0 | 160 | 0 | 160 |
| Superplasticizer (% of cement wt.) | 0.5 | 0.5 | 0.5 | 0.4 |
| Rolled sand 0/1 | 191 | 191 | 191 | 191 |
| Rolled sand 0/4 | 572 | 572 | 572 | 572 |
| Limestone aggregate 4/6 | 247 | 247 | 247 | 247 |
| Limestone aggregate 6/10 | 247 | 247 | 247 | 247 |
| Limestone aggregate 10/14 | 285 | 285 | 285 | 285 |
| Limestone aggregate 14/20 | 361 | 361 | 361 | 361 |
| W/C ratio | 0.5 | 0.5 | 0.5 | 0.5 |

TABLE 3-continued

Concrete compositions and slump and flow table test results

|  | Mixture | | | |
| --- | --- | --- | --- | --- |
|  | M1 | M2 | M3 | M4 |
| Properties | | | | |
| Slump (mm) | 160 | 160 | 170 | 150 |
| Flow (mm) | 490 | 510 | 570 | 580 |
| Air content (vol. %) | 1.5 | 1.8 | 2.1 | 1.6 |
| Density (kg/m$^3$) | 2390 | 2380 | 2370 | 2380 |

The results given in this table demonstrate that the use of alkaline stainless steel slag waste water instead of drinking water has no detrimental effect on the workability of the fresh concrete.

2. Compression Strengths of the Cured Concrete Mixtures of Table 3.

The compression strengths of the four concrete mixtures described in Table 3 were determined after 1, 7 and 28 days, each time on three samples, in accordance with the standard NBN NE 12390-3. The samples were cubes of about 150×150×150 mm. The obtained average compression strengths are given in Table 4.

TABLE 4

Average compression strengths of the hardened concrete mixtures of Table 3.
Compression strengths (N/mm$^2$)

|  | Mixture | | | |
| --- | --- | --- | --- | --- |
|  | M1 | M2 | M3 | M4 |
| After 1 day | 26.0 | 26.5 | 14.5 | 14.5 |
| After 7 days | 46.5 | 46.0 | 40.0 | 39.5 |
| After 28 days | 54.5 | 53.0 | 55.5 | 53.5 |

These test results show that the use of the alkaline waste water has no detrimental effect on the compression strength of the produced concrete.

Example 3

Accelerated Setting During the First Hours: Mortar Experiment

This mortar tests have demonstrated an effect of the alkaline stainless steel slag processing waste water on the setting speed of mortar during the first hours.

TABLE 5

Mortar compositions and initial compression strength developments.

|  | Mixture | | | |
| --- | --- | --- | --- | --- |
|  | M5 | M6 | M7 | M8 |
| Composition (volume parts) | | | | |
| CEM I 52,5 R | 2.0 | 2.0 | 0 | 0 |
| CEM III/A 42,5 LHHS | 0 | 0 | 2.0 | 2.0 |
| Drinking water | 1.0 | 0 | 1.0 | 0 |
| Waste water | 0 | 1.0 | 0 | 1.0 |
| Sand 0/4 (Varenberg) | 4.0 | 4.0 | 4.0 | 4.0 |

TABLE 5-continued

Mortar compositions and initial compression strength developments.

|  | Mixture | | | |
| --- | --- | --- | --- | --- |
|  | M5 | M6 | M7 | M8 |
| W/C ratio | 0.5 | 0.5 | 0.5 | 0.5 |
| Compression strength (N/mm$^2$MPa) | | | | |
| After 11 hours | 3.12 | 3.87 (=+24%) | | |
| After 15 hours | 12.08 | 13.08 (=+8.3%) | 1.81 | 1.69 (=−6.6%) |
| After 24 hours | 26.13 | 26.22 (=+0.3%) | 4.29 | 5.12 (=+19%) |
| After 48 hours |  |  | 12.90 | 14.75 (=+14%) |

The alkaline waste water used in combination with CEM I causes an accelerated setting in the course of the first 24 hours, which may be advantageous for molded applications enabling to demold the molded mortar or concrete products more quickly. With CEM III, which sets much more slowly than CEM I, an accelerated setting can be seen as from a time between 15 and 24 hours, with a maximum acceleration being observed after about 24 hours. The compression strength obtained after 48 hours is still higher with the alkaline waste water than with drinking water.

Example 4

Chromium Leaching from Concrete

Cubes of 150×150×150 mm were made with the following concrete composition (kg/m$^3$):

| CEM III/A 42,5 N LA: | 320 |
| --- | --- |
| Waste water: | 160 |
| River sand 0/2 mm: | 730 |
| Crushed limestone 2/20 mm: | 1200 |
| W/C ratio | 0.5 |

The waste water was stainless steel slag neutralization water having a pH of 12.8 and containing (in mg/l):

|  | Total | Dissolved |
| --- | --- | --- |
| Cr total | 0.708 | 0.669 |
| Cr (VI) | <0.025 | <0.025 |
| Mo | 4.830 | 4.380 |
| Ni | 0.012 | 0.0115 |

Based on the above described composition of the concrete, about 0.047 mg Cr/kg concrete is incorporated via the waste water in the concrete. Different analyses were made on the concrete, more particularly a total analysis, a shake test (DIN 38414-S4), a maximum availability test (NEN 7341), a diffusion tank test (NEN 7345) and a column test (NEN 7343). Especially the results of the column test NEN 7343 demonstrate that the chromium contained in the waste water used as production water for the concrete is bound in the concrete so that it is no or much less available for leaching. In this column test the concrete is crushed so that more than 95 wt. % of the particles have a size smaller than 4 mm. The crushed concrete is placed in a column which is continuously percolated with water acidified with nitric acid to a pH of 4. The total amount of percolation water comprises 10 times the weight of the concrete in the column. The flow rate of the percolation water is adjusted so that the test takes about 21 days. In case all the Cr dissolved in the process water would remain available for leaching, at least about 0.04 mg Cr would leach per kg concrete. However, as appears from the leaching results indicated in Table 6, less than 0.025 mg of Cr leaches out of the concrete, notwithstanding the fact that the cement used to produce the concrete also contained already a lot of Cr (see the result of the total analysis).

TABLE 6

Heavy metal contents and leaching results of the concrete produced with stainless steel waste water.

| Method | Parameter | Unit | Cr | Mo | Ni |
|---|---|---|---|---|---|
| Total analysis | | mg/kg | 16.5 | <9.8 | 10 |
| Shake test DIN 38414-S4 | | mg/l | <0.01 | 0.0135 | <0.002 |
| Maximum availability test NEN 7341 | | mg/kg | 1.6 | 0.65 | 2.7 |
| Diffusion tank test NEN 7345 | Total emission | mg/m$^2$ | 1.07 | <0.5 | 0.46 |
| | Immision over 100 years | mg/m$^2$ | 3.55 | <1.53 | <1.53 |
| Column test NEN 7343 | | mg/kg | <0.025 | 0.17 | <0.06 |

From the test results for Mo indicated in this table, in particular the column test leaching result, it appears that the molybdenum contained in the waste water is also bound in the concrete. In fact, about 0.32 mg Mo/kg concrete is added via the waste water to the concrete whereas only 0.17 mg Mo/kg concrete leaches out in the column test.

The invention claimed is:

1. A method for recycling waste water from a stainless steel slag treatment process wherein stainless steel slag is brought into contact with water thereby producing the waste water which contains heavy metals, including at least chromium, characterised in that the waste water is used for manufacturing mortar and/or concrete, which mortar and/or concrete made by mixing at least one hydraulic binding agent, at least one aggregate and water.

2. A method according to claim 1, characterised in that the waste water used to manufacture the mortar and/or concrete has a pH higher than 7, in particular higher than 9, more particularly higher than 11 and even more particularly higher than 12.

3. A method according to claim 1, characterised in that the hydraulic binding agent contains di- and tricalcium silicates.

4. A method according to claim 3, characterised in that the hydraulic binding agent comprises Portland clinker.

5. A method according to claim 4, characterised in that the hydraulic binding agent comprises at least 10% by weight of the Portland clinker.

6. A method according to claim 1, characterised in that the hydraulic binding agent further contains gypsum.

7. A method according to claim 1, characterised in that the hydraulic binding agent further contains ground granulated blast furnace slag.

8. A method according to claim 1, characterised in that the hydraulic binding agent further contains fly ash.

9. A method according to claim 1, characterised in that the mortar and/or concrete is made with cement containing the hydraulic binding agent, the mortar and/or concrete being in particular made with at least 65 kg, preferably with at least 100 kg and more preferably with at least 150 kg of cement per cubic meter but with less than 500 kg, preferably with less than 450 kg and more preferably with less than 400 kg of cement per cubic meter.

10. A method according to claim 9, characterised in that the mortar and/or concrete is made with an amount of water which comprises more than 30 wt. % of the amount of cement used to produce the mortar and/or concrete.

11. A method according to claim 1, characterised in that the waste water further contains molybdenum, in at least 1 mg/l.

12. A method according to claim 1, characterised in that the waste water contains at least 0.2 mg/l.

13. A method according to claim 1, characterised in that the water used to manufacture the mortar and/or concrete comprises at least 50% of the waste water.

14. A method according to claim 1, characterised in that the waste water is produced by repeatedly spraying water onto stainless steel slag.

15. A method according to claim 1, characterised in that the waste water is produced in a wet jigging apparatus wherein stainless steel slag particles are separated based on their density.

* * * * *